(12) United States Patent
Tan et al.

(10) Patent No.: US 12,290,777 B2
(45) Date of Patent: May 6, 2025

(54) FILTER SCREEN COMPONENT, BASE ASSEMBLY, CLOTHES DRYER, AND WASHING AND DRYING INTEGRATED MACHINE

(71) Applicants: GUANGDONG MIDEA WHITE HOME APPLIANCE TECHNOLOGY INNOVATION CENTER CO., LTD., Foshan (CN); MIDEA GROUP CO., LTD., Foshan (CN)

(72) Inventors: Fagang Tan, Foshan (CN); Fangzhen Zheng, Foshan (CN)

(73) Assignees: GUANGDONG MIDEA WHITE HOME APPLIANCE TECHNOLOGY INNOVATION CENTER CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 699 days.

(21) Appl. No.: 17/284,469

(22) PCT Filed: Dec. 20, 2018

(86) PCT No.: PCT/CN2018/122315
§ 371 (c)(1),
(2) Date: Apr. 11, 2021

(87) PCT Pub. No.: WO2020/077801
PCT Pub. Date: Apr. 23, 2020

(65) Prior Publication Data
US 2021/0394106 A1    Dec. 23, 2021

(30) Foreign Application Priority Data

Oct. 15, 2018  (CN) .......................... 201811198967.X

(51) Int. Cl.
*B01D 46/00*    (2022.01)
*B01D 46/26*    (2006.01)
(Continued)

(52) U.S. Cl.
CPC ..... *B01D 46/0056* (2013.01); *B01D 46/0002* (2013.01); *B01D 46/26* (2013.01);
(Continued)

(58) Field of Classification Search
CPC ............ B01D 46/0056; B01D 46/0002; B01D 46/26; B01D 46/48; B01D 46/78;
(Continued)

(56) References Cited

U.S. PATENT DOCUMENTS 1,975,335 A * 10/1934 Smith ...................... D01G 9/10
                                                       55/432
3,008,543 A * 11/1961 Bourdale .................. B04C 1/00
                                                       55/304
(Continued)

FOREIGN PATENT DOCUMENTS

| CN | 2837343 Y | 11/2006 |
|---|---|---|
| CN | 103403246 A | 11/2013 |

(Continued)

OTHER PUBLICATIONS

First OA of CN Application 201811198967.X.
(Continued)

*Primary Examiner* — Stephen Hobson

(57) ABSTRACT

A filter screen component, a base assembly, a clothes dryer, and a washing and drying integrated machine. The filter screen component comprises a motor and a filter screen part; the filter screen part comprises an annular filter screen body having holes; one end of the filter screen body is connected to a rotary shaft of the motor, and the other end is provided with an opening. The filter screen component, the base (Continued)

assembly, the clothes dryer, and the washing and drying integrated machine can not only effectively filter impurities such as soft flocks in an air flow, but also require, when cleaning the impurities such as soft flocks, no additional cleaning parts or manual cleaning; the cleaning is thoroughly completed.

10 Claims, 5 Drawing Sheets

(51) Int. Cl.
  *B01D 46/48* (2006.01)
  *B01D 46/78* (2022.01)
  *B01D 46/79* (2022.01)
  *D06F 25/00* (2006.01)
  *D06F 58/22* (2006.01)
  *F16C 17/00* (2006.01)

(52) U.S. Cl.
  CPC ............ *B01D 46/48* (2013.01); *B01D 46/78* (2022.01); *B01D 46/79* (2022.01); *D06F 25/00* (2013.01); *D06F 58/22* (2013.01); *B01D 2279/55* (2013.01); *F16C 17/00* (2013.01)

(58) Field of Classification Search
  CPC ................ B01D 46/79; B01D 2279/55; B01D 46/2403; D06F 25/00; D06F 58/22
  See application file for complete search history.

(56) References Cited

U.S. PATENT DOCUMENTS

| | | | | |
|---|---|---|---|---|
| 3,034,223 A * | 5/1962 | Lynch | ...................... | D06F 58/22 34/79 |
| 3,085,348 A * | 4/1963 | Adey | ...................... | D06F 58/22 34/79 |
| 3,132,006 A * | 5/1964 | Brucken | ................ | D06F 58/22 34/79 |
| 3,306,596 A * | 2/1967 | Hollowell | ............... | D06F 58/22 432/75 |
| 3,382,014 A * | 5/1968 | Marley | ................. | F16C 17/042 384/106 |
| 3,443,696 A * | 5/1969 | Schutte | ................ | B01D 33/727 55/408 |
| 3,448,858 A * | 6/1969 | Mills | .................... | B01D 21/267 209/210 |
| 3,635,534 A * | 1/1972 | Barnett | ................ | F16C 17/042 384/106 |
| 3,677,612 A * | 7/1972 | Barnett | ................ | F16C 17/024 384/103 |
| 3,977,847 A * | 8/1976 | Clark | .................... | B01D 46/28 428/95 |
| 4,108,778 A * | 8/1978 | Lambert | ................ | B01D 33/25 210/493.1 |
| 4,193,779 A * | 3/1980 | Hencke | ................ | B01D 46/26 55/408 |
| 4,208,076 A * | 6/1980 | Gray | ..................... | F16C 17/024 384/105 |
| 4,296,976 A * | 10/1981 | Heshmat | ............... | F16C 17/024 384/309 |
| 4,314,409 A * | 2/1982 | Cartier | .................. | D06F 58/22 55/296 |
| 4,462,170 A * | 7/1984 | Burkall | .................. | D06F 58/22 34/605 |
| 4,621,930 A * | 11/1986 | Gu | ........................ | F16C 17/042 384/105 |
| 4,624,583 A * | 11/1986 | Saville | ................. | F16C 17/042 384/105 |
| 4,682,900 A * | 7/1987 | Gu | ........................ | F16C 17/042 384/106 |
| 4,885,009 A * | 12/1989 | Schneider | .............. | B01D 46/78 55/284 |
| 4,899,462 A * | 2/1990 | Putnam | ................... | D06F 58/02 34/82 |
| 4,903,508 A * | 2/1990 | Durazzani | ............... | D06F 25/00 68/4 |
| 4,969,934 A * | 11/1990 | Kusik | ....................... | B04C 5/10 95/271 |
| 5,143,528 A * | 9/1992 | Dongelmans | ...... | B01D 46/2403 34/82 |
| 5,157,848 A * | 10/1992 | Dongelmans | ......... | B01D 46/71 34/85 |
| 5,376,268 A * | 12/1994 | Ikeda | ................... | B01D 33/073 210/247 |
| 5,938,341 A * | 8/1999 | Eccles | .................... | F16C 27/08 384/106 |
| 6,311,796 B1 * | 11/2001 | Mayer | .................... | B62D 25/10 180/69.2 |
| 6,354,741 B1 * | 3/2002 | Saville | .................. | F16C 17/042 384/106 |
| 6,540,914 B1 * | 4/2003 | Smith | ................... | B01D 35/143 210/402 |
| 6,890,375 B2 * | 5/2005 | Huber | .................... | A47L 9/165 95/271 |
| 6,948,853 B2 * | 9/2005 | Agrawal | ............... | F01D 25/168 384/105 |
| 7,261,300 B2 * | 8/2007 | Agrawal | ............... | F16J 15/3432 277/411 |
| 7,497,627 B2 * | 3/2009 | Saville | .................. | F16C 17/042 384/106 |
| 8,646,981 B2 * | 2/2014 | Peterson | ................ | F16C 33/26 384/309 |
| 8,651,743 B2 * | 2/2014 | Peterson | ................ | E21B 4/003 384/309 |
| 12,173,751 B2 * | 12/2024 | Shakil | ..................... | F16C 43/02 |
| 2001/0010486 A1 * | 8/2001 | Schmidt | .................. | H01F 7/081 335/220 |
| 2002/0124729 A1 * | 9/2002 | Dudley | ..................... | A47L 9/20 55/467 |
| 2005/0066538 A1 * | 3/2005 | Goldberg | .............. | D06F 58/206 34/218 |
| 2008/0104856 A1 * | 5/2008 | Armstrong | ............ | D06F 58/203 34/60 |
| 2008/0235978 A1 * | 10/2008 | Epstein | ................... | D06F 58/22 34/82 |
| 2014/0103689 A1 * | 4/2014 | Birkbeck | ............ | A47C 1/03255 297/341 |
| 2016/0058192 A1 * | 3/2016 | Drew | ....................... | A47C 3/18 297/344.21 |
| 2018/0030645 A1 * | 2/2018 | Kulkarni | ................. | D06F 58/22 |

FOREIGN PATENT DOCUMENTS

| | | | | |
|---|---|---|---|---|
| CN | 107568324 A | * | 1/2018 | |
| CN | 206843794 U | | 1/2018 | |
| DE | 102013108565 A1 | | 2/2015 | |
| GB | 1386526 A | * | 3/1975 | ............ B01D 46/26 |
| JP | H0928770 A | | 2/1997 | |
| JP | H11270887 A | | 10/1999 | |
| JP | 2001248869 A | | 9/2001 | |
| JP | 2008006044 A | | 1/2008 | |
| JP | 2009142351 A | | 7/2009 | |
| JP | 2011012743 A | | 1/2011 | |
| JP | 2013135789 A | | 7/2013 | |
| JP | 2015167694 A | | 9/2015 | |
| JP | 2017510425 A | | 4/2017 | |
| JP | 6373020 B2 | | 8/2018 | |
| KR | 20100070016 A | | 6/2010 | |
| WO | 2012134159 A3 | | 10/1999 | |
| WO | WO-2022258058 A1 | * | 12/2022 | ......... A47J 36/2461 |

OTHER PUBLICATIONS

OA received in JP Application No. 2021-543551; mailed Dec. 19, 2023.
Supplementary European Search Report of EP Application No. 18937239.4.

(56) References Cited

OTHER PUBLICATIONS

First Office Action issued on Mar. 3, 2023 regarding the EP counterpart 18937239.4.
First Office Action issued on May 17, 2022 regarding the JP Application No. 2021-543551.

* cited by examiner

FILTER SCREEN COMPONENT, BASE ASSEMBLY, CLOTHES DRYER, AND WASHING AND DRYING INTEGRATED MACHINE

CROSS-REFERENCES TO RELATED APPLICATIONS

The present disclosure is a national phase application of International Application No. PCT/CN2018/122315, filed on Dec. 20, 2018, which claims priority to Chinese patent application No. 201811198967.X filed on Oct. 15, 2018, the entireties of which are herein incorporated by reference.

FIELD

The present disclosure relates to the field of household appliances, in particular to a filter screen component, a base assembly, a clothes dryer and a washing and drying integrated machine.

BACKGROUND

A clothes dryer will produce a lot of debris during the process of drying clothes. In order to prevent debris generated during the drying process of the clothes dryer from entering into other structures of the clothes dryer (the entering of the debris will affect the performance of the clothes dryer), the clothes dryers are generally provided with a filter device to filter debris.

For the current filter device, it is generally needs to manually clean the debris on a filter screen regularly, or needs to provide a cleaning component on the clothes dryer to clean the filter screen. However, manual removing of debris are time-consuming and laborious, and the cleaning component on the clothes dryer for removing debris by mechanical contact has following disadvantages:

1. Debris on the filter screen will be transferred from the filter screen to the cleaning component, then the debris will build up, and the debris will breed bacteria over time;
2. Due to the filter screen has a lot of small meshes, the cleaning component can only clean the debris on the surface of the filter screen, but cannot clean the debris in the small meshes of the filter screen, and thus the debris cannot be completely removed;
3. Debris are only disposed into another cavity by the cleaning component, and still needs to be cleaned manually.

SUMMARY

The purpose of the present disclosure is to overcome the problems of time-consuming, laborious and incomplete cleaning of the current filter device for filtering the debris and other impurities.

In order to achieve the above objective, an embodiment of the disclosure provides a filter screen component including a motor and a filter screen part, the filter screen part includes an annular filter screen body having multiple meshes, an end of the filter screen body is connected to a rotary shaft of the motor, and the other end is provided with an opening.

In an embodiment, the filter screen part may further include an end cover arranged at the end of the filter screen body, the motor is connected with the end cover, a central part of the end cover is recessed inwardly along an axial direction to form a depressed part, and the motor is located at least partially in the depressed part.

In an embodiment, the filter screen component may further include a water spray part for spraying water to the filter screen body.

In an embodiment, the water spray part is located in an interior of the filter screen body to spray water from the interior to an inner circumferential surface of the filter screen body, or the water spray part is located outside the filter screen body to spray water to an outer circumferential surface of the filter screen body.

An embodiment of another embodiment of the disclosure provides a base assembly, including a base and the filter screen component as described above, herein the base is formed with an air duct for airflow to flow through, the motor is fixed on the base, and the filter screen body of the filter screen part is located in the air duct to enable the airflow in the air duct to blow onto an outer circumferential surface of the filter screen body.

In an embodiment, a drainage cavity is formed at a bottom of the air duct; the drainage cavity is in communication with a drainage hole for drainage.

In an embodiment, the base assembly may further include a water pump for drawing water out of the drainage cavity through the drainage hole.

In an embodiment, the base includes a first plate and a second plate provided with an exhaust hole, the first plate and the second plate is arranged opposite to one other, a space between the first plate and the second plate forms the air duct, the motor of the filter screen component is fixed on the first plate, the end of the filter screen part is provided with the opening is attached to the second plate, and the opening is aligned with the exhaust hole.

In an embodiment, the end of the filter screen part provided with the opening is provided with a first wear sheet surrounding the opening, the second plate is provided with a second wear sheet cooperating and rubbing with the first wear sheet.

In an embodiment, an elastic gasket is arranged between the second plate and the second wear sheet.

In an embodiment, the base includes a baffle for preventing debris dropped from the filter screen body from flowing toward an air inlet of the base.

According to yet another embodiment of the disclosure, a clothes dryer including the base assembly as described above is provided.

According to still another embodiment of the disclosure, a washing and drying integrated machine including the base assembly as described above is provided.

The filter screen component, the base assembly, the clothes dryer, and the washing and drying integrated machine provided by the present disclosure cannot only effectively filter impurities such as debris in the airflow, but also have the following advantages in the removing of the debris from the filter: since debris is removed by centrifugal force, there is no need to provide additional cleaning components that are in contact with the filter screen, to avoid transferring debris to the additional cleaning components; once the motor is activated, the debris can be removed automatically without manual cleaning; this cleaning method cannot only remove debris from the surface of the filter screen, but also remove debris in the small meshes of the filter screen, and thus a thorough clean is obtained.

LIST OF REFERENCE NUMERALS

Figure 1:
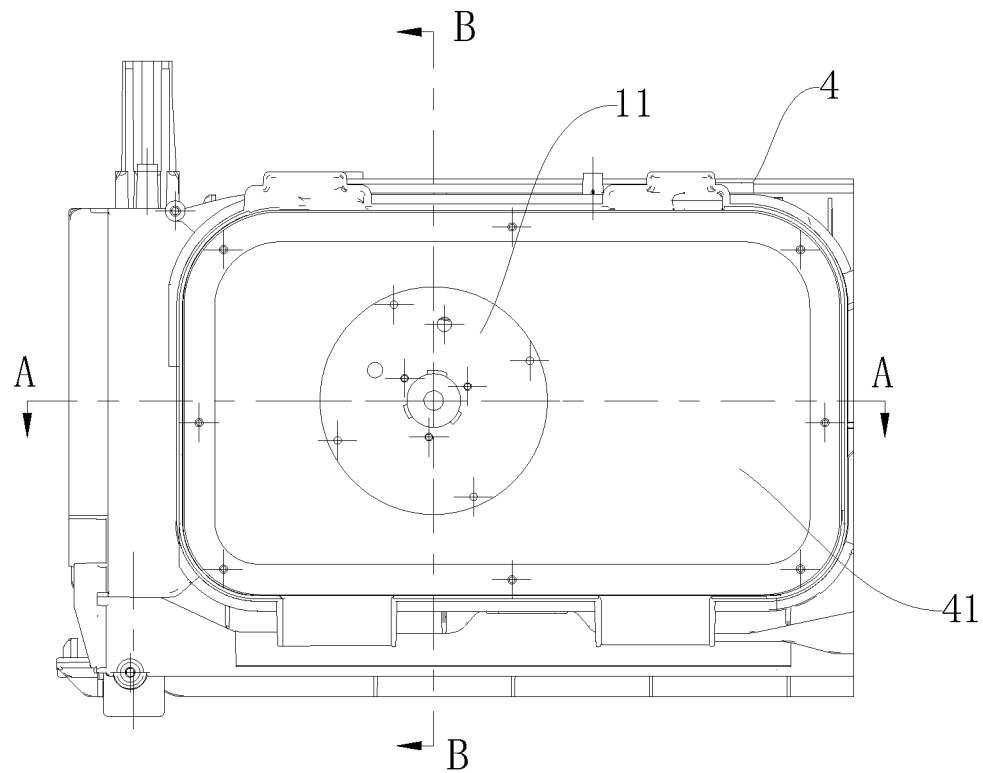
FIG. 1 is a schematic view of a base assembly provided with a filter screen component according to the present disclosure.

1: motor; 11: motor end cover; 2: filter screen part; 21: frame; 211: first annular body; 212: second annular body; 213: connecting rib; 214: end cover; 215: depressed part; 216: opening; 217: shaft sleeve; 22: filter screen; 3: water spray part; 31: nozzle; 4: base; 41: first plate; 411: mounting hole; 42: second plate; 421: exhaust hole; 43: air duct; 44: water pump mount; 45: baffle; 5: first wear sheet; 6: second wear sheet; 7: elastic gasket.

DETAILED DESCRIPTION OF THE DISCLOSURE

The embodiment of the present disclosure will be described in detail below with reference to the accompanying drawings. It should be understood that the embodiment described herein are only used to illustrate and explain the disclosure, and are not used to limit the present disclosure.

It should be noted that the embodiments of the present disclosure and the characteristics of the embodiments can be combined with each other if there is no conflict.

In the description of the present disclosure, it should be understood that the orientation or positional relationship indicated by the terms "center", "longitudinal", "transverse", "length", "width", "thickness", "up", "down", "left", "right", "vertical", "horizontal", "top", "bottom", "axial", "radial", "circumferential" is based on the orientation or positional relationship shown in the drawings. It is only for the convenience of describing the present disclosure and simplifying the description, rather than indicating or implying the device or element referred to have a orientation, be constructed and operated in an orientation, and therefore cannot be understood as a limitation of the present disclosure. In addition, "inner", "outer" should be understood as the inner and outer relative to the contour of each part itself.

In addition, the terms "first" and "second" are only used for description purposes, and cannot be understood as indicating or implying relative importance or implicitly indicating the number of indicated features. Therefore, the features defined by "first" and "second" may explicitly or implicitly that there is at least one such feature.

Figure 2:
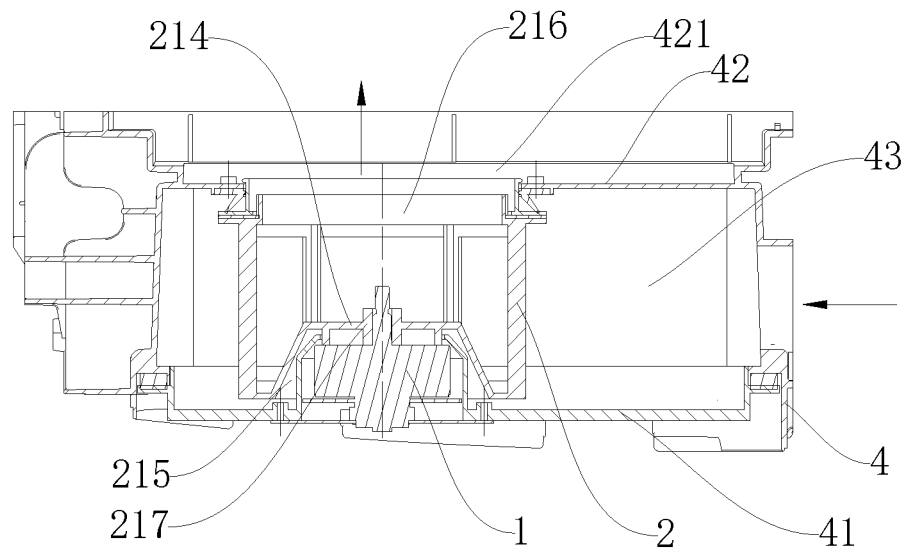
FIG. 2 is a schematic section view along the line A-A in FIG. 1.
Figure 3:
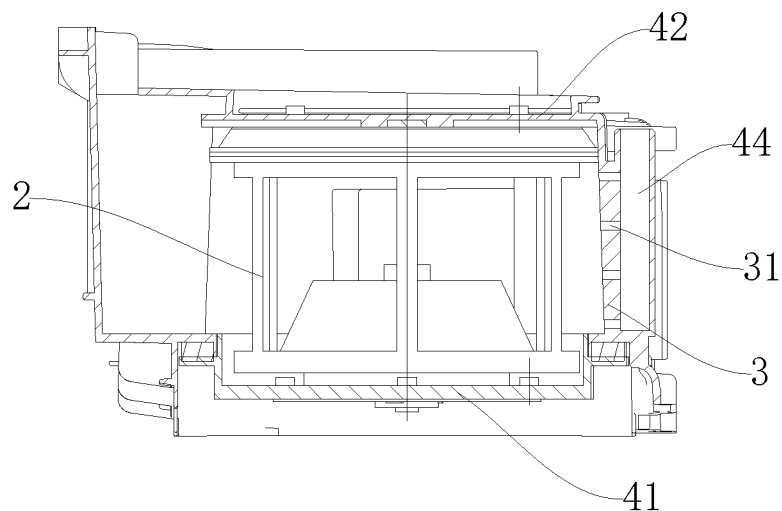
FIG. 3 is a schematic section view section along the B-B in FIG. 1.

As shown in FIGS. 1 to 3, the present disclosure provides a filter screen component including a motor 1 and a filter screen part 2 which includes an annular filter screen body having multiple meshes. An end of the filter screen body is connected to a rotary shaft of the motor 1, and the other end is provided with an opening 216.

The present disclosure provides a filter screen component which can be installed in equipment that needs to filter debris or other impurities, such as a clothes dryer, a washing and drying integrated machine, an air conditioner, or a purifier. As shown in FIGS. 1 to 3 (especially as shown in FIG. 2), the filter screen component is installed in an air duct 43 of a base 4 of the clothes dryer, an airflow enters into the air duct 43 from an air inlet on the base 4. The airflow in the air duct 43 can blow onto an outer surface of the annular filter screen body, to intercept debris in the airflow for drying clothes. Then, the airflow passes through the interior of the annular filter screen body and flows out from the opening 216. The motor 1 can be activated when it is necessary to remove debris from the filter screen part 2, then the motor 1 drives the filter screen part 2 to rotate, and debris and other impurities on the filter screen part 2 will drop from the filter screen under the action of centrifugal force. In one embodiment, water is sprayed on the filter screen part 2 to moisten debris, so that the drop of debris under the action of centrifugal force can be facilitated and rising of dust can be avoided.

The filter screen component provided by the present disclosure cannot only effectively filter impurities such as debris in the airflow, but also have the following advantages in the removing of the debris from the filter: since debris is removed by centrifugal force, there is no need to provide additional cleaning components that are in contact with the filter screen, to avoid transferring debris to the additional cleaning components; once the motor is activated, the debris can be removed automatically without manual cleaning; this cleaning method cannot only remove debris from the surface of the filter screen, but also remove debris in the small meshes of the filter screen, and thus a thorough clean is obtained.

In one embodiment of the present disclosure, the filter screen part 2 further includes an end cover 214 arranged at the end of the annular filter screen body. The rotary shaft of the motor 1 is connected with the end cover 214. A central part of the end cover 214 is recessed inwardly along an axial direction to form a depressed part 215. The motor 1 is located at least partially in the depressed part 215. This arrangement can render the structure compact.

Figure 4:
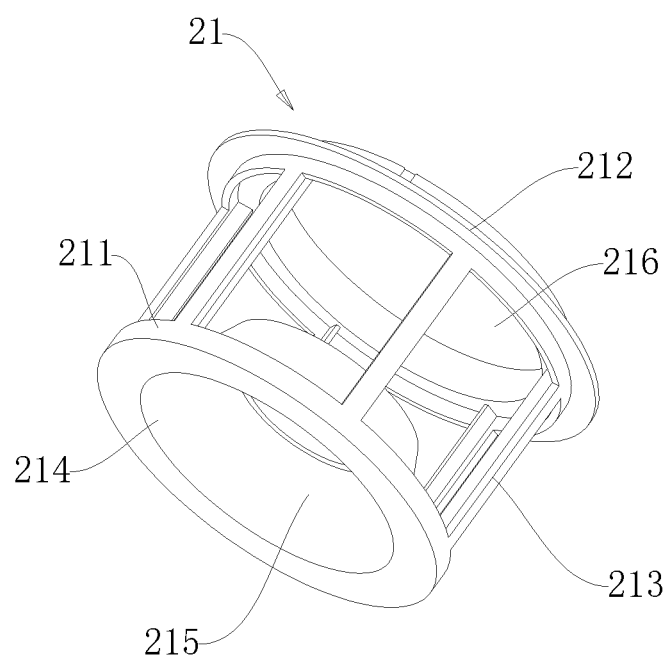
FIG. 4 is a schematic view of a structure of a frame of an annular filter screen.

In one embodiment, the annular filter screen part 2 includes a frame 21 and a filter screen 22 arranged on the frame 21. The structure of the frame 21 is shown in FIG. 4, the frame 21 includes a first annular body 211 arranged at one end of the frame, a second annular body 212 arranged at the other end of the frame, and a connecting rib 213 connected between the first annular body 211 and the second annular body 212. The filter screen 22 having multiple meshes for filtering debris is arranged in a circumferential direction between the first annular body 211 and the second annular body 212, to form an annular filter screen body. The frame 21 also includes the end cover 214 integrally formed with the first annular body 211. The end cover 214 is recessed inward to form a depressed part 215 in the shape of a general frustum. A shaft sleeve 217 arranged around the rotary shaft of the motor 1 is provided at the bottom of the depressed part 215 (as shown in FIG. 2). The shaft sleeve 217 is fixed to the rotary shaft of the motor 1, to drive the filter screen part 2 to rotate by the motor 1.

In order to moisten debris on the filter screen, in one embodiment, the filter screen component further includes a water spray part 3 for spraying water on the outer circumferential surface of the filter screen body. The water spray part 3 may include multiple nozzles 31. As shown in FIG. 3, in the clothes dryer, the water spray part 31 can be directly formed on the base 4 of the clothes dryer. Of course, a separate water spray part 31 is also possible in this case.

Another embodiment of the present disclosure provides a base assembly. As shown in FIGS. 1 to 3, the base assembly includes the base 4 and the filter screen component as described above. The base 4 is formed with an air duct 43 for airflow to flow through, the motor 1 is fixed on the base 4, and the filter screen body of the filter screen part 2 is located in the air duct 43 to enable the airflow in the air duct 43 to blow onto an outer circumferential surface of the filter screen body, in order to filter debris in the airflow.

Figure 7:
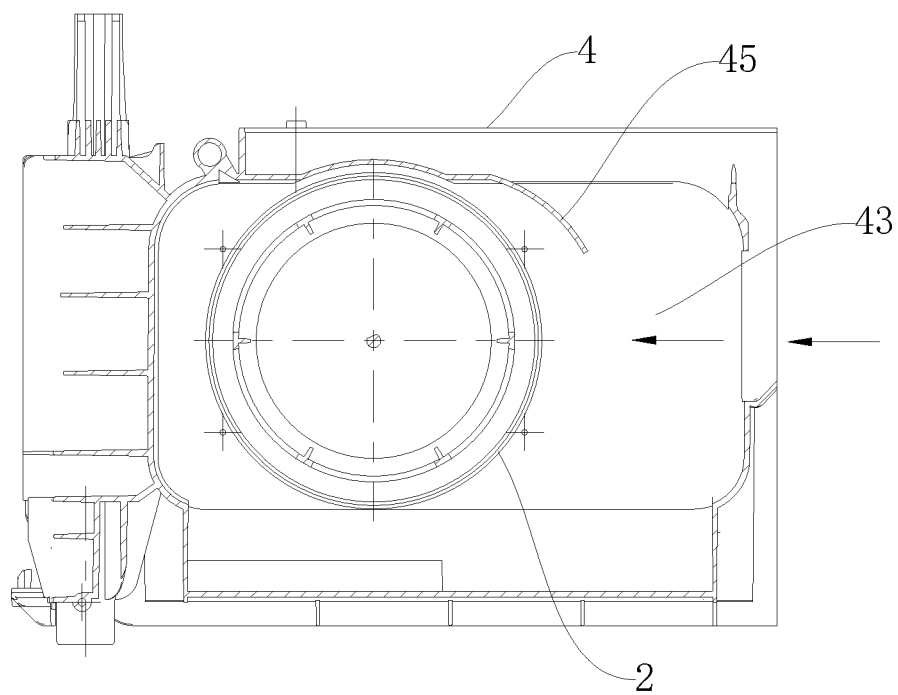
FIG. 7 is another schematic section view of the base assembly in FIG. 1.

In one embodiment, as shown in FIG. 7, the base 4 includes a baffle 45 for preventing debris, which is dropped from the filter screen body, from flowing toward an air inlet of the base 4. The baffle 45 extends from a side wall of the base 4 on an upper side of the outer circumferential surface of the filter screen body, and is formed by being bent toward the outer circumferential surface of the filter screen body. Under the action of the baffle 45, debris dropped under the action of centrifugal force can flow downward, but cannot flow in the direction of the air inlet.

In one embodiment, a drainage cavity is formed at a bottom of the air duct 43; the drainage cavity is in communication with a drainage hole for drainage. In one embodiment, the drainage cavity is a condensate water cavity provided on the base 4 for collecting condensate water. After debris are separated under the action of centrifugal force, debris drop into the drainage cavity and can be discharged from the drainage hole with the condensed water, without further manual cleaning.

In addition, the base 4 can be also provided with a water spray part 3 for spraying water to the filter screen part 2 and a water pump for supplying water to the water spray part 3. In an embodiment, as shown in FIG. 3, the water spray part 3 is directly formed on the base 4 (that is, a hole operated as a nozzle 31 is opened on the structure of the base 4 to form the water spray part 3), and a water pump mount 44 is provided on the base 4, and the water pump can be arranged on the water pump mount 44 to supply water to the water spray part 3. Of course, it is also possible to provide a separate water spray part 3 for spraying water, and the water spray part on the base 2. The water sprayed by the water spray part 3 carries debris and drops into the drainage cavity, and then debris are discharged from the drainage cavity.

In addition, a water pump can be provided to drain the water from the drainage cavity sooner. The water is drawn out from the drainage hole of the drainage cavity through the water pump.

Figure 5:
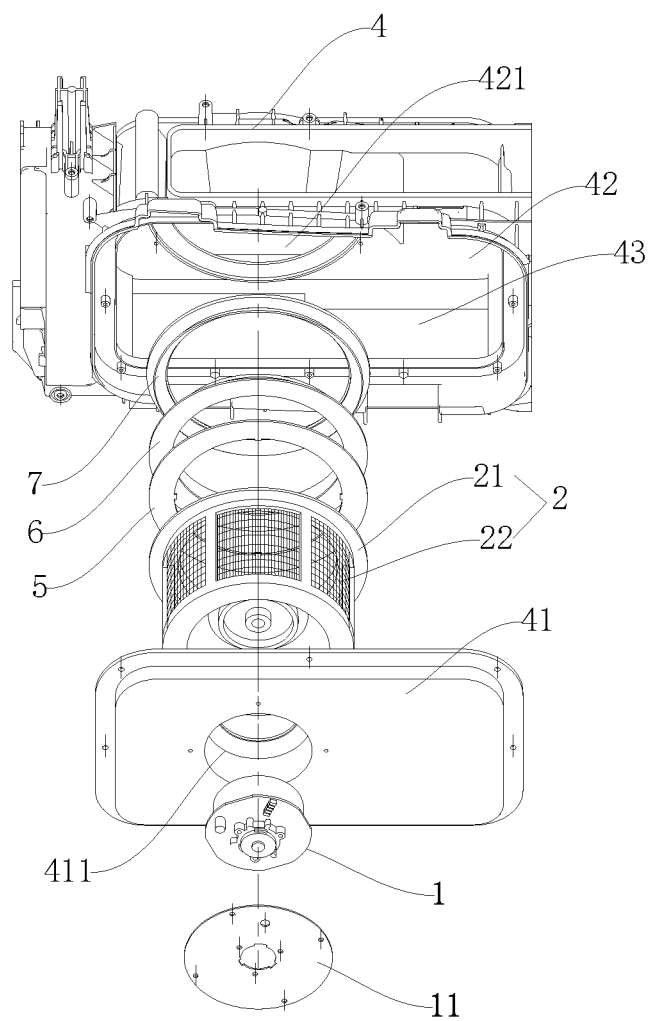
FIG. 5 is a schematic exploded view of the base assembly in FIG. 1.
Figure 6:
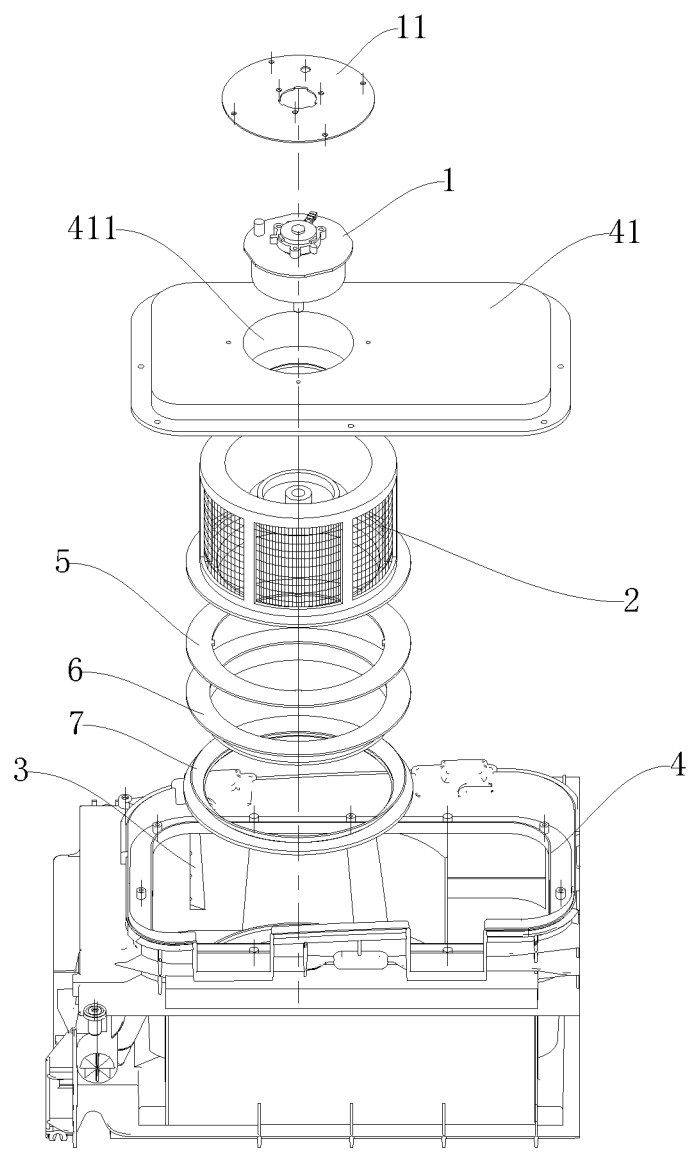
FIG. 6 is a schematic exploded view of the base assembly in FIG. 1 viewed from another direction.

Further, the installation of the filter screen component on the base 4 is shown in FIG. 2, FIG. 5 and FIG. 6. The base 4 includes a first plate 41 and a second plate 42 provided with an exhaust hole 421, the first plate and the second plate is arranged opposite to one other. A space between the first plate 41 and the second plate 42 forms the air duct 43. The motor 1 of the filter screen component is fixed on the first plate 41. The end of the filter screen part 2 provided with the opening 216 is attached to the second plate 42, and the opening 216 is aligned with the exhaust hole 421.

In one embodiment, as shown in FIG. 5, the first plate 41 can be detached from the base 4. The first plate 41 is provided with a mounting hole 411. The motor 411 is mounted in the mounting hole 411, and the motor 1 is located partially in the depressed part 215 of the end cover 214 of the filter screen part 2. A motor end cover 11 covering the mounting hole 411 is fixed on the first plate 41. The motor end cover 11 is also fixedly connected to the motor 1 to fix the motor on the first plate 41. In addition, the arrangement of the motor end cover 11 helps to protect the motor 1 and optimize the appearance.

Due to the end of the filter screen body of the filter screen part 2 is provided with an end cover 214 while the other end is attached to the second plate 42, the airflow in the air duct 43 does not enter into the filter screen body from both ends, the airflow can only enter into it through the meshes on the filter screen body, which will prevent debris from entering into the interior of the filter screen body.

During the rotation, there will be friction between the end of the filter screen body attached to the second plate 42 and the second plate 42. In one embodiment, in order to avoid friction, the end of the filter screen body provided with the opening 216 is provided with a first wear sheet 5 surrounding the opening 216, the second plate 42 is provided with a second wear sheet 6 cooperating and rubbing with the first wear sheet 5. The first wear sheet 5 and the second wear sheet 6 rub against each other during the rotation of the filter screen part 2.

In one embodiment, an elastic gasket 7 is arranged between the second plate 42 and the second wear sheet 6. When the end of the filter screen body abuts on the second plate 42, the elastic gasket 7 can keep the surface of the second wear sheet 6 in permanent contact with the first wear sheet 5, to realize better seal between the first wear sheet 5 and the second wear sheet 6, and avoid producing a gap between the first wear sheet and the second wear sheet into which debris can enter.

When the base assembly is used in the clothes dryer (it can also be used in other electrical equipment, here is the clothes dryer as an example), the airflow generated by the clothes dryer during the clothes drying process flows through the filter screen part 2. The filter screen part 2 can filter impurities (such as debris) in the airflow. After the clothes drying is finished, the motor 1 can be activated when it is necessary to remove debris from the filter screen part 2. The motor 1 drives the filter screen part 2 to rotate, and water can be sprayed to the filter screen of the filter screen part 2 by the water spray part 3 at the same time. Debris drops into the drainage cavity under the action of centrifugal force, and is directly discharged with the water in the drainage cavity, without manual cleaning.

According to yet another embodiment of the disclosure provides a clothes dryer including the base assembly as described above.

According to still another embodiment of the disclosure provides a washing and drying integrated machine including the base assembly as described above. Herein, the washing and drying integrated machine is electrical equipment with washing and drying functions.

What is claimed is:

1. A clothes dryer, comprising a base assembly, wherein base assembly comprises:
   a base and a filter screen component, wherein the base is formed with an air duct for airflow to flow through, a motor being fixed on the base;
   wherein the filter screen component comprises the motor and a filter screen part, the filter screen part comprising an annular filter screen body having a plurality of meshes, a first end of the annular filter screen body being connected to a rotary shaft of the motor, and a second end of the annular filter screen body being provided with an opening;
   wherein the annular filter screen body of the filter screen part is located in the air duct to enable the airflow in the air duct to blow onto an outer circumferential surface of the annular filter screen body, pass through interior of the annular filter screen body and flow out from the opening of the annular filter screen body;
   wherein the second end of the annular filter screen body is provided with a first wear sheet and a second wear sheet, and the second wear sheet cooperates and rubs with the first wear sheet; and wherein debris on the filter screen part drops from the annular filter screen body under action of centrifugal force when the motor works.

2. The clothes dryer according to claim 1, wherein the filter screen part further comprises an end cover arranged at an end of the annular filter screen body, the motor being connected with the end cover, a central part of the end cover being recessed inwardly along an axial direction to form a depressed part, and the motor being located at least partially in the depressed part.

3. The clothes dryer according to claim 1, further comprising a water spray part for spraying water to the annular filter screen body.

4. The clothes dryer according to claim 3, wherein the water spray part is located in an interior of the annular filter screen body to spray water from the interior to an inner circumferential surface of the annular filter screen body, or the water spray part is located outside the annular filter screen body to spray water to an outer circumferential surface of the annular filter screen body.

5. The clothes dryer according to claim 1, wherein a drainage cavity is formed at a bottom of the air duct, the drainage cavity being in communication with a drainage hole for drainage.

6. The clothes dryer according to claim 5, further comprising a water pump for drawing water out of the drainage cavity through the drainage hole.

7. The clothes dryer according to claim 1, wherein the base comprises a first plate and a second plate provided with an exhaust hole, the first plate and the second plate arranged opposite to one other, a space between the first plate and the second plate forming the air duct, the motor of the filter screen component being fixed on the first plate, the end of the filter screen part provided with the opening being attached to the second plate, and the opening being aligned with the exhaust hole.

8. The clothes dryer according to claim 7, wherein the second plate is provided with the second wear sheet.

9. The clothes dryer according to claim 8, wherein an elastic gasket is arranged between the second plate and the second wear sheet.

10. The clothes dryer according to claim 1, wherein the base comprises a baffle for preventing debris dropped from the annular filter screen body from flowing toward an air inlet of the base.

* * * * *